Jan. 29, 1946.  S. R. HORAK ET AL  2,393,634
COMBAT PARACHUTE
Filed June 19, 1944  4 Sheets-Sheet 1

INVENTORS
STANLEY R. HORAK
BY ROBERT V. TYRRELL
ATTORNEYS

Jan. 29, 1946.　　　S. R. HORAK ET AL　　　2,393,634
COMBAT PARACHUTE
Filed June 19, 1944　　　4 Sheets-Sheet 2

INVENTORS
STANLEY R. HORAK
BY ROBERT V. TYRRELL
ATTORNEYS

Jan. 29, 1946.    S. R. HORAK ET AL    2,393,634
COMBAT PARACHUTE
Filed June 19, 1944    4 Sheets-Sheet 3

INVENTORS
STANLEY R. HORAK
ROBERT V. TYRRELL
BY
ATTORNEYS

Jan. 29, 1946.   S. R. HORAK ET AL   2,393,634
COMBAT PARACHUTE
Filed June 19, 1944   4 Sheets-Sheet 4

INVENTORS
STANLEY R. HORAK
BY ROBERT V. TYRRELL
ATTORNEYS

Patented Jan. 29, 1946

2,393,634

UNITED STATES PATENT OFFICE 2,393,634

COMBAT PARACHUTE

Stanley R. Horak, Racine, Wis., and Robert V. Tyrrell, Los Angeles, Calif.

Application June 19, 1944, Serial No. 541,080

9 Claims. (Cl. 244—152)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to parachutes, and more particularly to the provision of a parachute especially adapted for use in military combat tactics to enable troops to descend rapidly from airplanes over enemy territory.

The primary object of the invention is to provide a parachute of the type mentioned which will enable a jumper to descend rapidly at a rate approaching the free fall rate, but without losing consciousness, during a first or controlled rapid fall phase, and which is capable of providing a normal rate of descent at the will of the jumper during a second or normal arrested descent phase.

Another important object of the invention is to diminish the shock to a parachute jumper incident to the sudden opening of the canopy to fully open condition which is characteristic of parachutes of standard design.

Another object is to provide a parachute which will accomplish the foregoing objects with as little departure from standard parachute canopy design as possible.

Present designs of parachutes opening in one stage provide a comparatively slow rate of descent. This is necessary in order to reduce the shock of landing so as to minimize the risk of injury to the parachute jumper. The necessity for providing a comparatively slow rate of descent of the parachute, however, has certain disadvantages. One disadvantage involves the very great shock sustained by the parachute jumper upon the sudden opening of the parachute to a fully open condition after the interval of free fall ensuing between the time of jumping from the airplane and the time of opening of the parachute. Another disadvantage arises in the event that the parachute jumper is required to jump from an airplane at high altitude and to descend for a considerable distance through rarefied atmosphere without benefit of oxygen supply. With the standard type of parachute characterized by the comparatively slow rate of descent, the physiological effects upon the parachute jumper resulting from the slow rate of descent for a considerable distance through rarefied atmosphere without benefit of oxygen may be very serious.

For the purposes of military tactical operations with parachute jumpers, a slow rate of descent is disadvantageous in that the parachute jumper becomes an easy target for enemy fire. Furthermore, in such operations, it is of extreme importance that the parachute jumpers dispersed from airplanes over enemy territory may be permitted to descend to the ground very rapidly and as near as posssible to a designated point on the ground so that they may have maximum effectiveness in their operation against the enemy.

With the foregoing in mind, the present invention contemplates the provision of a parachute which is capable of opening in two stages, each of which envisages a predetermined condition of the canopy designed to effect a predetermined rate of descent, the first stage of opening producing a partially open condition and the second stage producing a fully open condition of the canopy, the time of initiating the respective opening stages being under the control of the jumper using such parachute.

The invention also contemplates the provision of manual control means operative to effect the opening of the parachute canopy to the respective partially open and fully open conditions in the order mentioned.

In carrying the invention into practice, we provide a parachute canopy composed of flexible material of the type presently in use, and having suitable load suspension lines attached thereto, means associated with said canopy and operative to constrict the same radially, and control means operable to release the canopy from constricted condition. We further provide the canopy with an aperture, or preferably, a plurality of apertures symmetrically arranged with respect to the apex of the canopy and a closure or closures for said apertures hingedly secured to the canopy adjacent the respective apertures, and means comprising lines secured to the free edge of the respective closure and also secured to the canopy and operative to draw the respective closure to a position substantially closing the aperture upon distention of the canopy to fully open, unconstricted condition. The constricting means may comprise draw-lines attached to the canopy at various points and passed loosely through radial channel seams or sleeves whereby, when the draw-lines are drawn through the channel seams, the material of the canopy is drawn together radially in a gather, thereby constricting the canopy radially. The draw-lines are arranged so that the material of the canopy is radially constricted in areas intermediate the points of attachment of the closure lines to the closure and to the canopy, whereby, when the canopy is so constricted, the closure lines are slack, so that when the parachute is opened out in descent to the partially open or constricted condition, the closures are free to open to the limit of the slackness of the closure lines.

We further provide retaining means releasably cooperable with the free ends of the constricting lines for retaining the latter in canopy constricting condition. The control means for releasing the canopy from constricted condition may comprise a line associated with said retaining means and leading to a point convenient to the jumper's hand, when he is suspended by the parachute in descent, for operation by the jumper under such condition to release the constricting lines from said retaining means to permit the canopy to assume fully distended, unconstricted condition.

Thus there is provided a parachute which, when released from its pack by the jumper during a descent, will open out to a partially open or radially constricted condition with the apertures therein unclosed by the covers provided therefor. The jumper may then descend with the parachute in this condition at a very rapid rate until he reaches a minimum safe altitude at which he desires to check the rate of descent to a normal or arrested rate. At such time the jumper operates the control line to release the draw-lines from the retaining means whereupon the canopy will open out to its fully open, unconstricted condition and the tension on the closure lines will draw the closures to substantially closed position, whereupon the full area of the canopy will be utilized to check the rate of descent to a normal arrested rate, such as to reduce the landing impact so that the risk of injury to the parachute jumper will be minimized.

Other objects, advantages and features of novelty will become apparent from the following detailed description taken in conjunction with the accompanying drawings, in which Fig. 1 is a bottom plan view of the canopy embodying the features of our invention, a portion of the canopy being shown in constricted condition;

Figure 1:
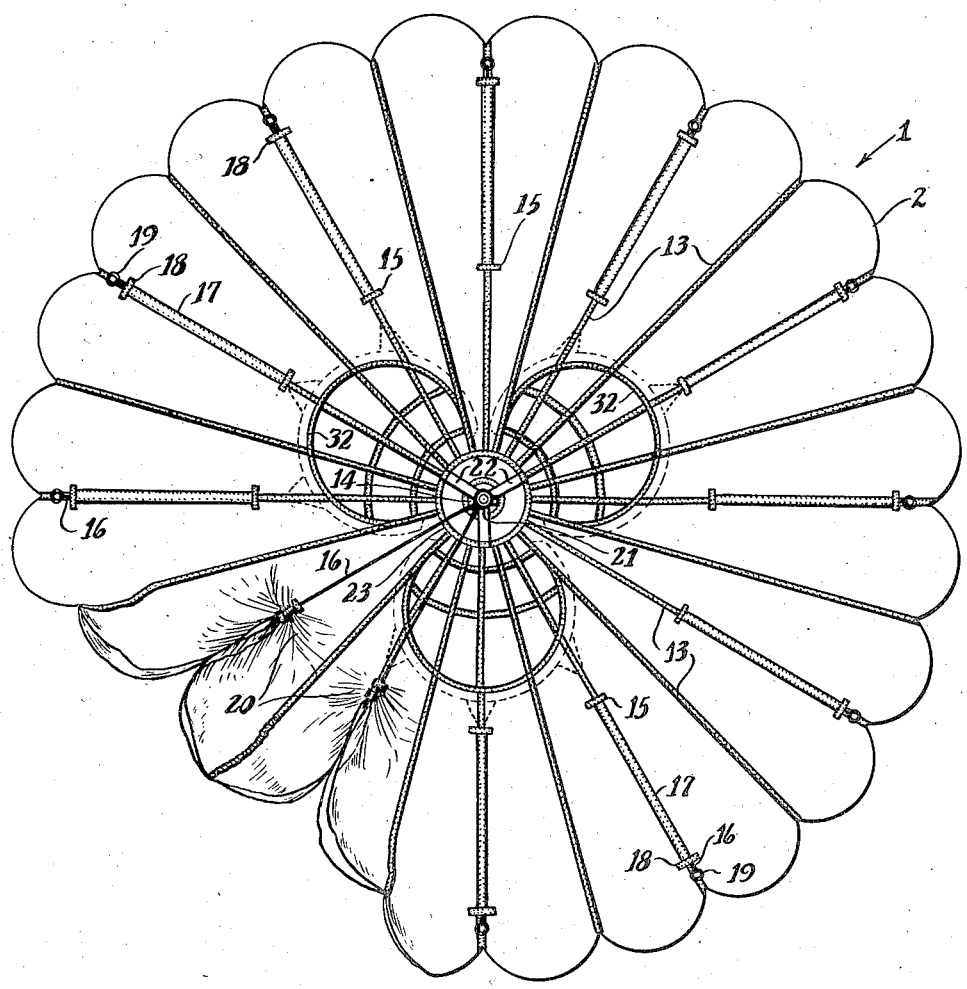

A parachute of the invention, generally designated by the numeral 1, comprises a canopy generally designated by the numeral 2, composed of flexible material such as silk or like fabric, and the usual load suspension lines 3, secured to the canopy and designed to be connected to suitable rings 4, 5, 6 and 7 (Figs. 3 and 4), said rings being associated respectively with straps 8, 9, 10 and 11 connected with the parachute harness 12 secured to the jumper. The canopy 2 is made up of a plurality of gores or panels stitched together along marginal seams 13 in the usual manner. The suspension lines 3 connect with the canopy at the outer marginal edge thereof, and continue along the canopy radially toward the apex thereof, the portion of each respective suspension line which is in contact with the canopy being enclosed within one of the respective seams 13 joining the adjacent panels of the canopy in the usual manner. The canopy 2 is provided with the usual vent opening 14 at the center or apex of the canopy.

Referring now more particularly to Fig. 1, the under, or inner, side of the parachute canopy 2 has secured thereto a plurality of reinforcing members 15, each preferably crossing one of the radial seams 13, and preferably, the reinforcing members 15 are symmetrically disposed with respect to the center of the canopy 2. To each of these members 15 is attached a draw-line 16 which may be passed loosely through guide means secured to the canopy, which guide means may comprise suitable radially disposed channels or sleeves provided by flexible tapes 17 stitched to the canopy 2 along alternate seams 13, and guides 18 secured to the canopy 2 across the tapes 17 at the open ends of channels provided by the latter. The draw-lines 16 are provided at their outer ends with rings 19 by which the draw-lines 16 are adapted to be pulled through the channels 17 and guides 18 for the purpose of drawing together or gathering a portion of the canopy material, as indicated at 20 (Figs. 1 and 4) intermediate the reinforcing members 15 and the guides 18. The drawing of the draw lines 16 through their respective channels 17 and guides 18 in the manner just indicated serves to constrict the canopy radially and the rings 19 are then fastened to retaining means generally indicated by the numeral 21 secured to the canopy 2 by means of tapes 22, three of the same being provided as shown in Fig. 1 for suspending the retaining means 21 adjacent the center of the canopy 2, one end of each tape 22 being secured to the canopy at a reinforcing seam 23.

Figure 3:
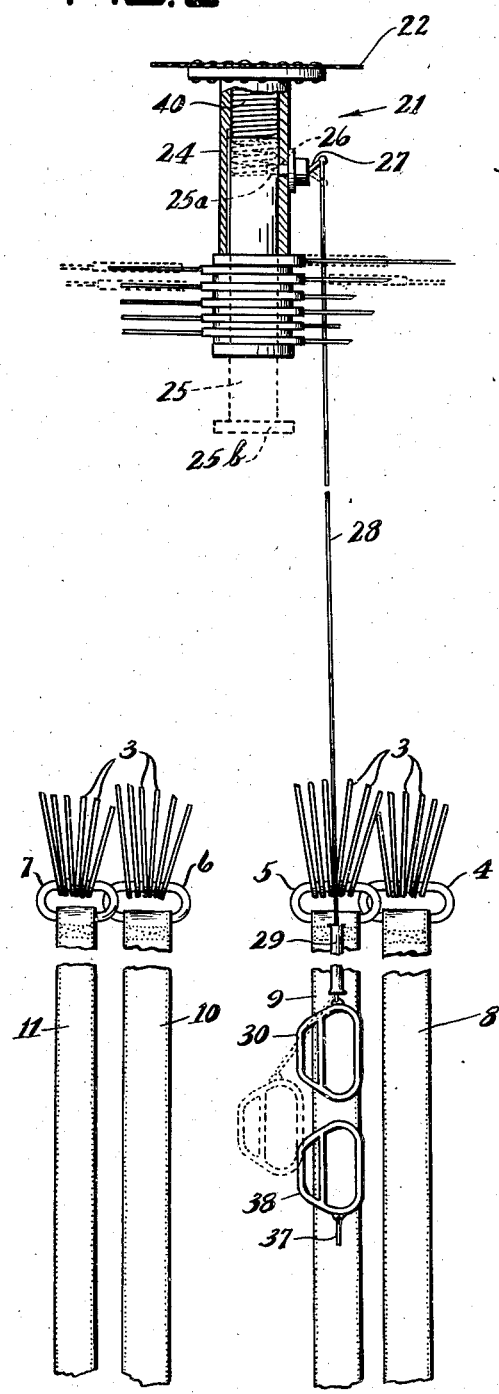
Fig. 3 illustrates the draw-line retaining means and the control means for releasing the same.

The retaining means 21 is shown more particularly in Fig. 3 as comprising a hollow tube 24 secured in any suitable manner to the free ends of the tapes 22. The tube 24 is adapted to receive the shank of a retaining member 25 provided with a recess 25a for receiving a spring pressed detent or latch 26 associated with the tube 24. The shank of the retaining member 25 is adapted to be inserted through the rings 19 after their respective draw-lines 16 are drawn up in the manner previously indicated, and then the shank of the retaining member 25 with the rings 19 assembled thereon is inserted within the tube 24 and locked in place therein by means of the spring pressed latch or detent 26, the rings 19 being retained on the member 25 by means of an annular flange 25b provided on the outer end thereof. The latch or detent 26 is associated with an operating member 27 to which is connected a control cord 28 which passes through a guide 29 secured to the lift strap 9, a pull ring 30 being secured to the control cord 28 at the end thereof passing through the guide 29.

Figure 2:
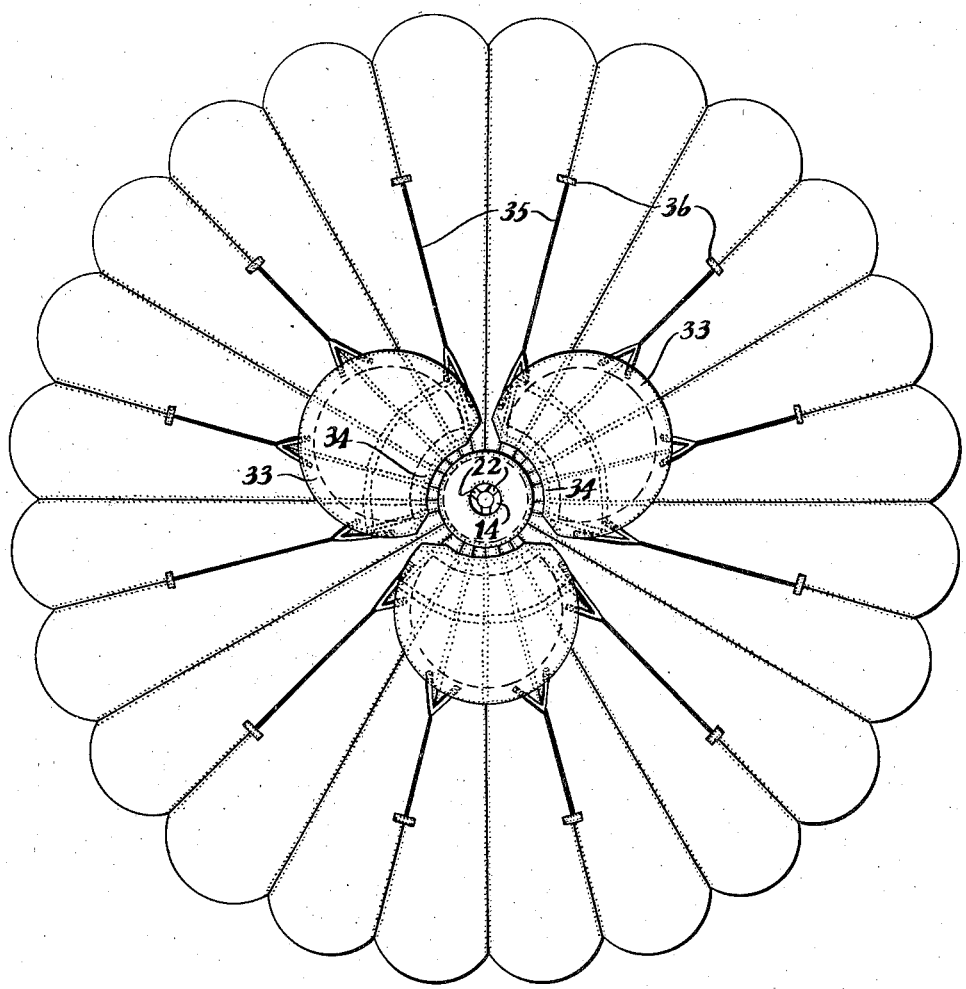
Fig. 2 is a top plan view of said canopy in fully open, unconstricted condition.
Figure 5:
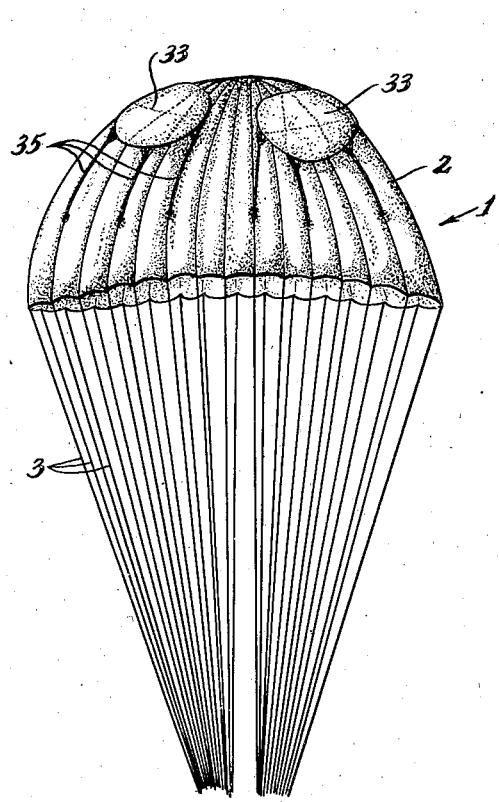
Fig. 5 illustrates the second stage, fully open, unconstricted condition of the parachute in descent during the second or arrested descent phase.

The parachute canopy 2 is provided with a plurality of air escape apertures 31 defined by the reinforcing seams or tapes 32 stitched to the canopy fabric around the margin of each aperture 31, the latter being preferably symmetrically disposed with respect to the apex of the canopy 2. The apertures 31 are adapted to be closed by covers or closures 33 formed of fabric like that of the canopy provided for each aperture 31, said covers 33 to be suitably reinforced and secured to the canopy by means of stitching as at 34 serving to permit hinge movement of the remaining portions of the respective covers 33 relative to the canopy 2 along the lines of the stitching 34. As seen best in Figs. 2 and 4, closure operating means comprising closure lines 35 are attached to the free reinforced edges of the closures 33 and the opposite ends of the closure lines 35 are secured to the canopy by means of reinforcements 36. The length of the closure lines 35 is such that the covers 33 will be drawn closed when the canopy is fully distended to open, unconstricted condition during descent, as illustrated in Fig. 5.

In the packing of the parachute of the invention, the ring ends 19 of the draw-lines 16 are grasped to pull the draw-lines 16 through the respective channel tapes 17 and guides 18 and the rings 19 are drawn toward the center of the canopy and attached to the retaining means 21 as in the manner above described. The operation of drawing the draw-lines 16 into position such that the rings 19 are connected with the retaining means 21, serves to draw together portions of the canopy intermediate the reinforcement members 15 and the guides 18 in a gather, as indicated at 20 in Figs. 1 and 4, thereby constricting the parachute canopy radially. The draw-lines 16 and the closure lines 35 are arranged in such a manner that the constricted areas of the canopy, or in other words, the areas 20 of the canopy, lie intermediate the apertures 31 and the points of attachment of the closure lines 35 to the canopy.

The foregoing operation of drawing up the draw-lines 16 and attaching the ring ends to the retaining means 21 also slackens the tension on the closure lines 35 by reason of the fact that the constriction or gathering of the canopy takes place in an area intermediate the ends of the closure lines 35. Therefore, when the parachute is released from its pack during a descent and opens to the constricted condition of Fig. 4, the slackness of the closure lines 35 will permit the covers 33 to open under air pressure. The constricting of the canopy thus limits or reduces the aperture-closing effectiveness of the closure lines 35.

Figure 4:
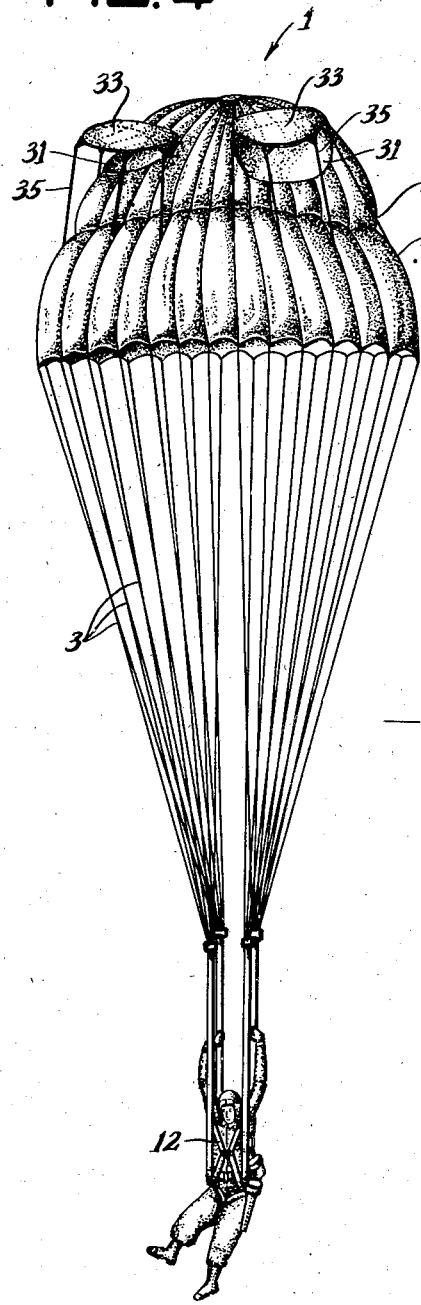
Fig. 4 illustrates the first stage, partially open, constricted condition of the parachute in descent during the first or controlled, rapid fall phase of descent.

Following the operation above mentioned of drawing up the draw-lines 16 and attaching the rings 19 to the retaining means 21, the parachute may be packed in the usual manner so that when a person jumps from an airplane with a parachute so packed and pulls the ripcord 37 attached to pull ring 38 (Fig. 3), the parachute will open to the condition illustrated in Fig. 4, wherein the canopy is maintained gathered or constricted, as there illustrated, by tension of the draw-lines 16 connected to the retaining means 21, the covers 33 being open as indicated in Fig. 4 to the limit permitted by the connection of the closure lines 35 to the canopy 2. When the canopy opens to the condition of Fig. 4 the rate of descent is reduced to a rate which is still very rapid but such as to enable the jumper to remain conscious. The descent with the canopy in the condition of Fig. 4 is referred to herein as the controlled rapid descent phase. The shock to the jumper incident to the opening of the canopy to the condition of Fig. 4 is obviously much less severe than would be the case in the abrupt opening of the canopy to fully open, unconstricted condition in a single stage as characteristic in the use of standard type parachutes. With the canopy in the condition illustrated in Fig. 4 the descent will be far more rapid than is normally the case, due to the restricted area of the canopy exposed to air pressure (the area of the canopy having been radially reduced, as before mentioned, by the radial constriction thereof effected by drawing up the draw-lines 16 and association of the rings 19 with the retaining means 21), the rapid rate of descent being also due in part to the escape of air through the openings 31, the covers 33 being open in the condition of Fig. 4. Now, when the jumper has descended with the parachute in the condition of Fig. 4 to the desired low or minimum safe altitude he may pull the release control ring 30 connected to the control cord 28, thereby moving the operating member 27 to the dotted line position of Fig. 3, withdrawing the latch 26 from the recess 25a of the retaining member 25 permitting the latter to drop free of the tube 24 so that the rings 19 will become disengaged from the retaining member 25. This releases the tension on the draw-lines 16 thereby releasing the canopy from the drawn or constricting effect of the draw-lines 16 and permitting the canopy 2 to be expanded radially to the fully distended, unconstricted condition of Fig. 5. The air pressure in distending the canopy 2 radially outwardly to its fully open or unconstricted condition serves to tension the closure lines 35 causing the covers 33 to be drawn to fully closed condition, substantially covering the air escape apertures 31. When the canopy opens to the fully open, unconstricted condition of Fig. 5, the rate of fall is again reduced much less abruptly and with much less shock to the jumper than is the case in single-phase full-opening standard design parachutes. When the parachute attains the condition of Fig. 5, the rate of descent is reduced to the normal or arrested rate in which the risk of injury to the jumper upon impact with the ground is minimized.

The quick disengagement of the retaining member 25 from the tube 24 is assisted by the provision of a spring 40 within the tube 24 and engaging the inner end of the shank of the retaining member 25, the spring 40 being under compression when the retaining member 25 is in latched condition within the tube 24. Thus, when the control cord 28 is pulled to release the latch 27 from the retaining member 25, the action of the spring 40 is to expel the retaining member 25 from the tube 24.

Figure 6:
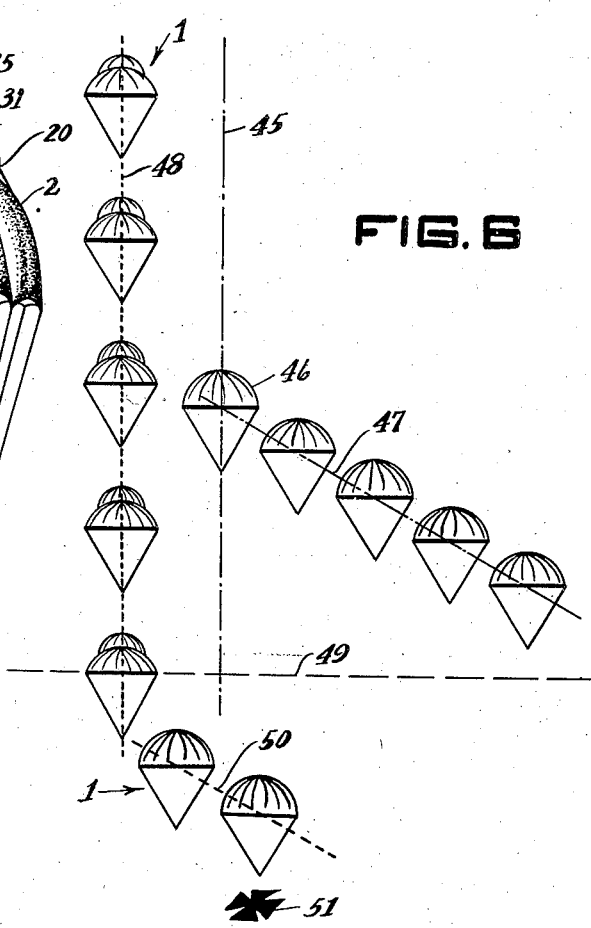
Fig. 6 shows a comparison of the respective descent paths of a parachute of the invention on the one hand and of a standard parachute on the other hand.

In Fig. 6, the dot-and-dash line 45 indicates the path of free fall through which the jumper descends prior to the opening of the standard parachute 46. The dot-and-dash line 47 indicates the path of descent of the standard parachute 46 upon abrupt opening of the same to its fully open condition in the usual manner, the dot-and-dash line 47 representing the slanting or gliding descent path of the standard parachute in normal arrested descent. In comparison, said Fig. 6 also illustrates the substantially vertical descent path of the parachute 1 of the present invention along the line 48 after said parachute 1 has been released from its pack and opened to the partially open, constricted condition of Fig. 4. The dotted line 48 therefore represents the substantially vertical descent path of the parachute 1 of the invention during the so-called rapid fall phase of descent with the parachute 1 in the partially open, constricted condition of Fig. 4. The broken line 49 in Fig. 6 represents the minimum safe altitude at which the parachute jumper using the parachute of the invention will operate the control cord 28 to release the parachute 1 from constricted condition, thereby permitting same to open to fully open, unconstricted condition of Fig. 5. Also Fig. 6 shows how the parachute 1 of the invention, upon being released from constricted condition of Fig. 4 at the minimum safe altitude 49, opens to the fully open, unconstricted condition of Fig. 5, and thereafter continues to descend in a slanting or gliding path represented by the dash line 50.

From the foregoing, it will be apparent that the construction of the parachute of the invention enables the jumper to descend much more rapidly, but at a rate at which he can maintain consciousness during the first or controlled rapid fall phase of descent with the parachute open to the partially open, constricted condition of Fig. 4.

Furthermore, Fig. 6 illustrates how this rapid fall with the parachute open to the partially open, constricted condition of Fig. 4 enables the jumper to descend along the line 48 more closely approaching the jumper's target 51, representing the spot on earth at which the jumper desires to land, and then, upon the opening of the parachute to the fully open, unconstricted condition of Fig. 5 at the minimum safe altitude 49, the jumper is enabled to descend in the normal slanting or gliding descent path 50 at the arrested or normal descent rate, and land substantially at the desired spot 51 on earth with substantially the same degree of reduction of landing impact as would occur in the descent of a standard type parachute opening to a fully open condition in a single stage. Fig. 6 illustrates the difficulty of landing at a desired spot 51 with the normal parachute, in view of the fact that with the single phase full opening of the standard parachute it is necessary to cause the latter to open at a much higher altitude than with the parachute of the invention so that there is a longer period of descent in the slanting or gliding descent path 47 of the standard parachute 46, which will cause the jumper in the descent with a standard parachute to drift far afield of the desired target 51 or spot at which he desires to land on earth.

The advantages of the present invention, therefore, include the ability to descend at a very rapid rate so that the jumper runs less risk of being shot down by enemy fire but yet is enabled to maintain consciousness until he reaches the minimum safe altitude 49, after which, upon the opening of the parachute to fully open condition, the jumper may descend at a normal arrested rate of descent so as to reduce landing impact, minimizing the risk of injury to the jumper upon landing. A second advantage of the parachute construction of the invention resides in the ability to land more closely to the desired spot on earth. A third advantage of the construction of the invention resides in the fact that the opening of the parachute to the fully open condition takes place in two stages, each of which opening stages is much less abrupt than the single stage full opening characteristic of standard parachutes, the two stage opening of the parachute of the invention, therefore, producing much less severe shocks to the jumper than is the case with the standard parachute.

Having thus described our invention, what we claim as new and desire to secure by Letters Patent is:

1. A parachute of the class described comprising a canopy composed of flexible material and having suitable load suspension lines attached thereto, an aperture in said canopy, a closure for said aperture hingedly secured to said canopy adjacent said aperture, closure operating means attached to the closure adjacent the free edge thereof and attached to said canopy and operative to draw the closure to a position substantially closing the aperture upon distention of the canopy to fully open condition, and means associated with said canopy and operable to constrict the same radially in an area intermediate the points of attachment of the closure operating means to the closure and to the canopy, whereby when the canopy is so constricted, the aperture closing effectiveness of said first means is restricted.

2. A parachute of the class described comprising a canopy composed of flexible material and having suitable load suspension lines attached thereto, an aperture in said canopy, a closure for said aperture hingedly secured to said canopy adjacent said aperture, closure operating means attached to the closure adjacent the free edge thereof and attached to said canopy and operative to draw the closure to a position substantially closing the aperture upon distention of the canopy to fully open condition, means associated with said canopy and operable to constrict the same radially in an area intermediate the points of attachment of the closure operating means to the closure and to the canopy, whereby when the canopy is so constricted, the aperture closing effectiveness of said first means is reduced, and control means operable from the region of the point of suspension of a body upon said suspension lines to release said first means from said constricting condition.

3. A parachute of the class described comprising a canopy composed of flexible material and having suitable load suspension lines attached thereto, an aperture in said canopy, a closure for said aperture hingedly secured to said canopy adjacent said aperture, a line attached to the closure adjacent the free edge thereof and also attached to the canopy and operative to draw the closure to a position substantially closing the aperture upon distention of the canopy to fully open unconstricted condition, and means associated with the canopy and operable to constrict the same radially in an area intermediate the points of attachment of the closure line to the closure and to the canopy.

4. A parachute of the class described comprising a canopy composed of flexible material and having suitable load suspension lines attached thereto, a plurality of apertures in said canopy symmetrically disposed with respect to the center thereof, a closure for each of said apertures hingedly secured to said canopy adjacent the respective aperture, a respective line attached to each closure adjacent the free edge thereof and also attached to the canopy and operative to draw the respective closure to a position substantially closing the respective aperture upon distention of the canopy to fully open unconstricted condition, and means associated with the canopy and operable to constrict the same radially in areas intermediate each of the respective apertures and the point of attachment of its respective closure line of the canopy.

5. A parachute of the class described comprising a canopy composed of flexible material and having suitable load suspension lines attached thereto, an aperture in said canopy, a closure for said aperture hingedly secured to said canopy adjacent said aperture, means associated with the closure adjacent the free edge thereof and also associated with the canopy and operative to draw the closure to a position substantially closing the aperture upon distention of the canopy to fully open condition, a draw-line having one end attached to the canopy, guide means associated with the canopy and cooperating with said draw-line for causing separated portions of the canopy, intermediate the aperture and the point of attachment of the closure line to the canopy, to be drawn together upon movement of the draw-line relative to said guide means, and retaining means releasably cooperable with said draw-line for retaining said separated portions of the canopy in drawn condition.

6. A parachute of the class described comprising a canopy composed of flexible material and having suitable load suspension lines attached thereto, an aperture in said canopy, a closure for said aperture hingedly secured to said canopy adjacent said aperture, means associated with the closure adjacent the free edge thereof and also associated with the canopy and operative to draw the closure to a position substantially closing the aperture upon distention of the canopy to fully open condition, a draw-line having one end attached to the canopy, guide means associated with the canopy and cooperating with said draw-line for causing separated portions of the canopy intermediate the aperture and the point of attachment of the closure line to the canopy to be drawn together upon movement of the draw-line relative to said guide means, retaining means releasably cooperable with said draw-line for retaining said separated portions of the canopy in drawn condition, and control means associated with said retaining means and operable from the region of the point of suspension of a body upon said suspension lines to release said draw-line from said retaining means.

7. A parachute of the class described comprising a canopy composed of flexible material and having suitable load suspension lines attached thereto, a plurality of apertures in said canopy symmetrically disposed with respect to the center thereof, a closure for each of said apertures, a respective closure line attached to each closure adjacent the free edge thereof and also attached to the canopy and operative to draw the respective closure to a position substantially closing the respective aperture upon distention of the canopy to fully open, unconstricted condition, a plurality of draw-lines each having one end attached to the canopy, the points of attachment of the respective draw-lines being spaced symmetrically with respect to the center of the canopy, a plurality of guide means each cooperating respectively with one of said draw-lines for causing radially separated portions of the canopy material in areas intermediate the apertures and the points of attachment of the closure lines to the canopy to be drawn together upon drawing of the free ends of the draw-lines relative to their respective guide means, and retaining means releasably cooperable with said draw-lines for retaining said separated portions of the canopy material in drawn condition.

8. A parachute of the class described comprising a canopy composed of flexible material and having suitable load suspension lines attached thereto, a plurality of apertures in said canopy symmetrically disposed with respect to the center thereof, a closure for each of said apertures, a respective closure line attached to each closure thereof, a closure for each of said apertures, a respective closure line attached to each closure adjacent the free edge thereof and also attached to the canopy and operative to draw the respective closure to a position substantially closing the respective aperture upon distention of the canopy to fully open unconstricted condition, a plurality of draw lines each having one end attached to the canopy, the points of attachment of the respective draw-lines being spaced symmetrically with respect to the center of the canopy, a plurality of guide means each cooperating respectively with one of said draw-lines for causing radially separated portions of the canopy material in areas intermediate the apertures and the points of attachment of the closure lines to the canopy to be drawn together upon drawing of the free ends of the draw-lines relative to their respective guide means, retaining means releasably cooperable with said draw lines for retaining said separated portions of the canopy material in drawn condition, and control means associated with said retaining means and operable from the region of the point of suspension of a body upon said suspension lines to release said draw-lines from said retaining means.

9. A parachute of the class described comprising a canopy composed of flexible material and having suitable load suspension lines attached thereto, an aperture in said canopy, a closure for said aperture hingedly secured to said canopy adjacent said aperture, and closure operating means attached to the closure adjacent the free edge thereof and also attached to the canopy and operative to draw the closure to a position substantially closing the aperture as a result of distention of the canopy to fully open condition.

ROBERT V. TYRRELL.
STANLEY R. HORAK.